(12) United States Patent
Ryu et al.

(10) Patent No.: US 11,088,443 B2
(45) Date of Patent: Aug. 10, 2021

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Han Sub Ryu, Gyeongsangbuk-do (KR); Gi Hwan Ahn, Chungcheongnam-do (KR); Dong Pil Park, Incheon (KR); Sung Ho Baek, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 16/854,415

(22) Filed: Apr. 21, 2020

(65) Prior Publication Data
US 2020/0251813 A1 Aug. 6, 2020

Related U.S. Application Data

(63) Continuation of application No. PCT/KR2019/012794, filed on Oct. 1, 2019.

(30) Foreign Application Priority Data

Oct. 16, 2018 (KR) .................. 10-2018-0123058

(51) Int. Cl.
*H01Q 1/38* (2006.01)
*H01Q 1/40* (2006.01)
*H04M 1/02* (2006.01)
*H01Q 1/24* (2006.01)

(52) U.S. Cl.
CPC ............. *H01Q 1/38* (2013.01); *H01Q 1/40* (2013.01); *H04M 1/0266* (2013.01); *H01Q 1/243* (2013.01)

(58) Field of Classification Search
CPC ............ H01Q 1/38; H01Q 1/40; H01Q 1/243; H01Q 9/0407; H01Q 1/364; H01Q 1/50; H01Q 1/22; H01Q 1/422; H04M 1/0266; H04M 1/026; G09F 9/00
See application file for complete search history.

(56) References Cited

U.S. PATENT DOCUMENTS

| | | | | |
|---|---|---|---|---|
| 7,847,753 | B2 * | 12/2010 | Ishibashi | H01Q 9/0407 343/897 |
| 2016/0093939 | A1 * | 3/2016 | Kim | H01Q 1/243 343/720 |
| 2016/0190678 | A1 * | 6/2016 | Hong | H01Q 1/273 343/700 MS |

FOREIGN PATENT DOCUMENTS

| | | |
|---|---|---|
| JP | 2017-175540 A | 9/2017 |
| KR | 10-1025054 B1 | 3/2011 |
| KR | 10-2013-0095451 A | 8/2013 |
| KR | 10-1343241 B1 | 12/2013 |
| KR | 10-2016-0012690 A | 2/2016 |
| KR | 10-1971490 B1 | 4/2019 |

* cited by examiner

*Primary Examiner* — Seung H Lee
(74) *Attorney, Agent, or Firm* — The PL Law Group, PLLC (57) ABSTRACT

An antenna device includes a dielectric layer and a radiation electrode on an upper surface of the dielectric layer. The radiation electrode includes a plurality of electrode lines therein. The radiation electrode has a visibility index in a range from −1.4 to 1.9. An electrode visibility is suppressed and a signaling sensitivity is enhanced from the radiation electrode. A display device including the antenna device is also provided.

15 Claims, 6 Drawing Sheets

ANTENNA DEVICE AND DISPLAY DEVICE INCLUDING THE SAME

CROSS REFERENCE TO RELATED APPLICATIONS AND CLAIM OF PRIORITY

The present application is a continuation application to International Application No. PCT/KR2019/012794 with an International Filing Date of Oct. 1, 2019, which claims the benefit of Korean Patent Application No. 10-2018-0123058 filed on Oct. 16, 2018 at the Korean Intellectual Property Office, the disclosures of which are incorporated by reference herein in their entirety.

BACKGROUND

1. Field

The present invention relates to an antenna device and a display device including the same. More particularly, the present invention related to an antenna device including an electrode pattern, and a display device including the same.

2. Description of the Related Art

As information technologies have been developed, a wireless communication technology such as Wi-Fi, Bluetooth, etc., is combined with a display device in, e.g., a smartphone. In this case, an antenna may be combined with the display device to provide a communication function.

Mobile communication technologies have been rapidly developed, an antenna capable of operating a high or ultra-high frequency communication is needed in the display device. Further, a thin display device having high transparency and resolution such as a transparent display, a flexible display, etc., is being developed, and improved transparency and flexibility are also required in the antenna.

As a display screen becomes larger in the display device, an area or a space for a bezel portion or a light-shielding portion is decreased. In this case, a space or an area for embedding the antenna is also decreased, and a radiation electrode for a signal transfer and reception in the antenna may overlap a display region of the display device. Thus, an image from the display device may be shielded by the radiation electrode, or the radiation electrode may be viewed by a user to degrade an image quality.

SUMMARY

According to an aspect of the present invention, there is provided an antenna device having improved visual property and signaling efficiency.

According to an aspect of the present invention, there is provided a display device including an antenna device with improved visual property and signaling efficiency.

The above aspects of the present invention will be achieved by the following features or constructions:

(1) An antenna device, including: a dielectric layer having a first surface and a second surface opposite to the first surface; and a radiation electrode on the first surface of the dielectric layer, the radiation electrode including a plurality of electrode lines, the radiation electrode having a visibility index in a range from −1.4 to 1.9, the visibility index being defined as Equation 1:

$$\text{Visibility Index} = \text{Log}(\text{contrast} \times \text{contrast sensitivity function (CSF) value}). \quad \text{[Equation 1]}$$

(2) The antenna device according to the above (1), wherein the CSF value in Equation 1 is calculated from Equations 2, 2-1 and 2-2 below:

$$CSF(L, f) = a(L, f)fe^{-b(L)f}(1 + 0.06e^{b(L)f})^{0.5} \quad \text{[Equation 2]}$$

$$a(L, f) = \frac{[540(1 + 0.7/L)^{-0.2}]}{[1 + 12(1 + f/3)^{-2}/w]} \quad \text{[Equation 2-1]}$$

$$b(L) = 0.3(1 + 100/L)^{0.15} \quad \text{[Equation 2-2]}$$

wherein, in the Equations 2, 2-1 and 2, L represents an average luminance (nt=cd/m$^2$), ω represents a viewing angle (degree), and f represents a spatial frequency (cycle per degree) when a distance between the antenna device and an eye of an observer is 400 mm.

(3) The antenna device according to the above (1), wherein the radiation electrode includes a mesh structure in which unit cells defined by the plurality of electrode lines are assembled.

(4) The antenna device according to the above (3), wherein a minimum distance between facing sides in each of the unit cells is in a range from 20 μm to 225 μm.

(5) The antenna device according to the above (4), wherein the minimum distance between the facing sides in each of the unit cells is in a range from 50 μm to 196 μm.

(6) The antenna device according to the above (3), wherein a line width of each of the plurality of electrode lines is in a range from 0.5 μm to 5 μm.

(7) The antenna device according to the above (3), wherein the mesh structure includes first electrode lines and second electrode lines which extend in different directions to cross each other, and each of the unit cells has a rhombus shape.

(8) The antenna device according to the above (3), further including: a transmission line connected to the radiation electrode on the dielectric layer; and a pad electrode connected to one end of the transmission line.

(9) The antenna device according to the above (8), wherein the pad electrode has a solid pattern structure.

(10) The antenna device according to the above (9), further including a contact electrically connecting the pad electrode and the transmission line to each other, wherein the pad electrode is located at a different level from the radiation electrode and the transmission line.

(11) The antenna device of the above (10), further including an insulating interlayer formed on the dielectric layer to cover the dielectric layer and the radiation electrode, wherein the contact is formed through the insulating interlayer.

(12) The antenna device according to the above (11), further including a protective layer covering the pad electrode and the insulating interlayer.

(13) The antenna device according to the above (3), further including a dummy electrode arranged around the radiation electrode.

(14) The antenna device according to the above (13), wherein the dummy electrode includes a mesh structure the same as that of the radiation electrode.

(15) A display device including the antenna device according to embodiments as described above.

According to exemplary embodiments of the present invention, an antenna device may include a radiation electrode having a mesh structure in which unit cells having a diamond shape or a rhombus shape may be assembled therein. The radiation electrode may be constructed to satisfy a visibility index range including values of a contrast and a contrast sensitivity function (CSF). Within the visibility index range, the radiation electrode may be prevented from being viewed by a user without degrading a transmittance of the antenna device.

In some embodiments, a minimum distance between facing sides in the unit cell may be controlled so that electrode lines included in the radiation electrode may be prevented from being viewed. Further, a line width of the electrode lines may be adjusted to control a resistance and a transmittance of the radiation electrode.

The antenna device may be inserted or mounted at a front-face portion of a display device while preventing the radiation electrode from being seen by a user of the display device. The line width of the electrode lines may be adjusted so that a signal sensitivity and the transmittance may be improved to prevent an image degradation of the display device.

The antenna device may include the mesh structure formed of a metal to have an improved flexible property, and thus may be effectively applied to a flexible display device.

DETAILED DESCRIPTION OF THE EMBODIMENTS

According to exemplary embodiments of the present invention, an antenna device is provided. The antenna device may include a radiation electrode that includes a mesh structure and may have improved transmittance and signal sensitivity while reducing an electrode visibility.

The antenna device may be a micro-strip patch antenna fabricated as a transparent film. For example, the antenna device may be applied to a device for high frequency band or ultra-high frequency band (e.g., 3G, 4G, 5G or more) mobile communications.

According to exemplary embodiments of the present invention, a display device including the antenna device is also provided. However, an application of the antenna device is not limited to the display device, and the antenna device may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
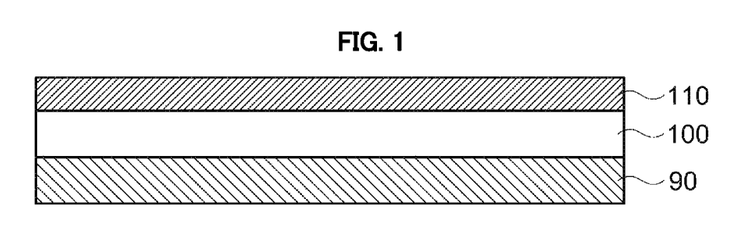
FIGS. 1 and 2 are a cross-sectional view and a top planar view, respectively, schematically illustrating an antenna device in accordance with exemplary embodiments.
Figure 2:
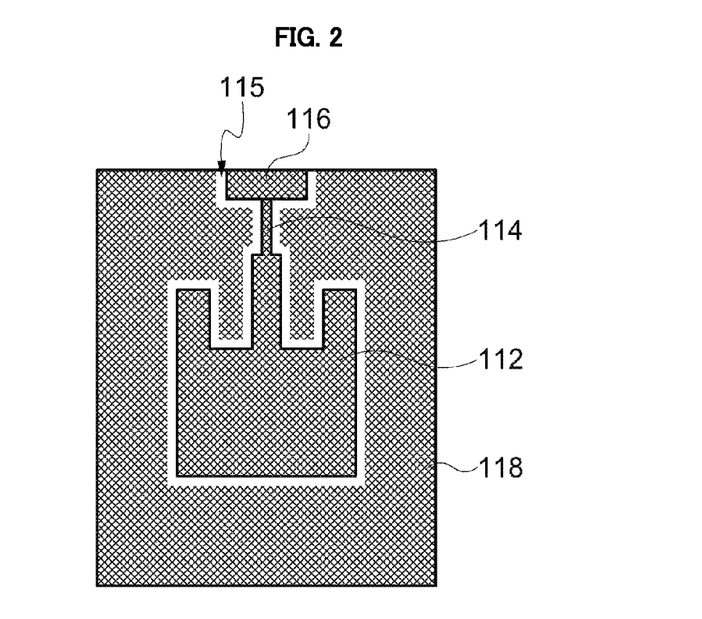

FIGS. 1 and 2 are a cross-sectional view and a top planar view, respectively, schematically illustrating an antenna device in accordance with exemplary embodiments.

Referring to FIGS. 1 and 2, the antenna device according to exemplary embodiments may include a dielectric layer 100 and a first electrode layer 110 on the dielectric layer 100. In some embodiments, a second electrode layer 90 may be further formed on a lower surface of the dielectric layer 100.

The dielectric layer 100 may include an insulation material having a predetermined dielectric constant. For example, the dielectric layer 100 may include an inorganic insulation material such as glass, silicon oxide, silicon nitride, a metal oxide, etc., or an organic insulation material such as an epoxy resin, an acryl resin, an imide-based resin, etc. The dielectric layer 100 may serve as a film substrate on which the first electrode layer 110 is formed.

For example, a transparent film may be used as the dielectric layer 100. The transparent film may include a thermoplastic resin, e.g., a polyester-based resin such as polyethylene terephthalate, polyethylene isophthalate, polyethylene naphthalate, polybutylene terephthalate, etc.; a cellulose-based resin such as diacetyl cellulose, triacetyl cellulose, etc.; a polycarbonate-based resin; an acryl-based resin such as polymethyl (meth)acrylate, polyethyl (meth)acrylate, etc.; a styrene-based resin such as polystyrene, an acrylonitrile-styrene copolymer; a polyolefin-based resin such as polyethylene, polypropylene, a polyolefin having a cyclo or norbornene structure, etc.; a vinyl chloride-based resin; an amide-based resin such as nylon, an aromatic polyamide, etc.; an imide-based resin; a polyether sulfone-based resin; a sulfone-based resin; a polyether ketone-based resin; a polyphenylene sulfide-based resin; a vinyl alcohol-based resin; a vinylidene chloride-based resin; a vinyl butyral-based resin; an allylate-based resin; a polyoxymethylene-based resin; an epoxy-based resin; a urethane or acryl urethane-based resin; a silicone-based resin, etc. These may be used alone or in a combination thereof.

In some embodiments, an adhesive film including, e.g., a pressure sensitive adhesive (PSA), an optically clear adhesive (OCA), or the like may be included in the dielectric layer 100.

In some embodiments, a dielectric constant of the dielectric layer 100 may be in a range from about 1.5 to about 12. If the dielectric constant exceeds about 12, a driving frequency may be excessively decreased and a desired high-frequency radiation may not be implemented.

As illustrated in FIG. 2, the first electrode layer 110 may include an antenna pattern including a radiation electrode 112 and a transmission line 114. The antenna pattern or the first electrode layer 110 may further include a pad electrode 116 that may be connected to a terminal of the transmission line 114.

In some embodiments, the first electrode layer 110 may further include a dummy electrode 118 arranged around the antenna pattern.

The first electrode layer 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy thereof. These may be used alone or in a combination thereof.

In an embodiment, the radiation electrode 112 may include silver or a silver alloy to have a low resistance. For example, the radiation electrode 112 may include a silver-palladium-copper (APC) alloy.

In an embodiment, the radiation electrode 112 may include copper (Cu) or a copper alloy in consideration of low resistance and pattern formation with a fine line width. For example, the radiation electrode 112 may include a copper-calcium (Cu—Ca) alloy.

In some embodiments, the first electrode layer 110 may include a transparent metal oxide such as indium tin oxide (ITO), indium zinc oxide (IZO), indium zinc tin oxide (IZTO), zinc oxide ($ZnO_x$), etc.

For example, the first electrode layer 110 may have a multi-layered structure including a metal layer or alloy layer and a transparent metal oxide layer.

In exemplary embodiments, the radiation electrode 112 may include a mesh structure. Accordingly, a transmittance of the radiation electrode 112 may be increased, and a flexibility of the antenna device may be improved. Thus, the antenna device may be effectively applied to a flexible display device.

In some embodiments, the dummy electrode 118 may also include a mesh structure that may be substantially the same as the mesh structure of the radiation electrode 112. In some embodiments, the dummy electrode 118 and the radiation electrode 112 may include the same metal.

The transmission line 114 may extend from one end of the radiation electrode 112 to be electrically connected to the pad electrode 116. For example, the transmission line 114 may extend from a protrusion formed at a central portion of the radiation electrode 112.

In an embodiment, the transmission line 114 may include a conductive material substantially the same as that of the radiation electrode 112, and may be formed by substantially the same etching process. In this case, the transmission line 114 and the radiation electrode 112 may be integrally connected to each other to be provided as a substantially unitary member.

In some embodiments, the transmission line 114 and the radiation electrode 112 may include substantially the same mesh structure.

The pad electrode 116 may be electrically connected to the radiation electrode 112 via the transmission line 114, and a driving circuit unit (e.g., an IC chip) and the radiation electrode 112 may be electrically connected by the pad electrode 116.

For example, a circuit board such as a flexible printed circuit board (FPCB) may be adhered to the pad electrode 116, and the driving circuit unit may be disposed on the FPCB. Accordingly, a signal transfer/reception may be implemented between the antennal pattern and the driving circuit unit. The driving circuit unit may be mounted directly on the FPCB. Alternatively, the driving circuit unit may be mounted on the FPCB via an intermediate circuit board such as a rigid circuit board.

In some embodiments, the pad electrode 116 may be located at the same layer or at the same level as that of the radiation electrode 112. In this case, the pad electrode 116 may also include a mesh structure substantially the same as that of the radiation electrode 112.

As described above, the dummy electrode 118 may include the mesh structure substantially the same as that of the radiation electrode 112, and may be electrically and physical separated from the antenna pattern and the pad electrode 116.

For example, a separation region 115 may be formed along a lateral line or a lateral profile of the antenna pattern to separate the dummy electrode 118 and the antenna pattern from each other.

As described above, the antenna pattern may be formed to include the mesh structure so that transmittance of the antenna device may be improved. In an embodiment, an electrode line include in the mesh structure may be formed of a low resistance-metal such as copper, silver, an APC alloy, a CuCa alloy, etc., to prevent a resistance increase. Thus, a transparent antenna device having a low resistance and a high sensitivity may be achieved.

Further, the dummy electrode 118 having the same mesh structure may be arranged around the antenna pattern so that the antenna pattern may be prevented from being viewed by a user of a display device due to a local electrode arrangement deviation.

For convenience of descriptions, only one antenna pattern is illustrated in FIG. 2. However, a plurality of the antenna patterns may be arranged on the dielectric layer 100 as an array shape.

In some embodiments, the second electrode layer 90 may serve as a ground layer of the antenna device. For example, a capacitance or an inductance may be generated between the radiation electrode 112 and the second electrode layer 90 in a thickness direction of the antenna device by the dielectric layer 100 so that a frequency range that may be operable by the antenna device may be controlled. For example, the antenna device may serve as a vertical radiation antenna.

The second electrode layer 90 may include a metal substantially the same as or similar to that included in the first electrode layer 110. In an embodiment, a conductive member of a display device to which the antenna device is employed may serve as the second electrode layer 90.

The conductive member may include a gate electrode of a thin film transistor (TFT), various wirings such as a scan line or a data line, various electrodes such as a pixel electrode, a common electrode, etc., included in a display panel.

Figure 3:
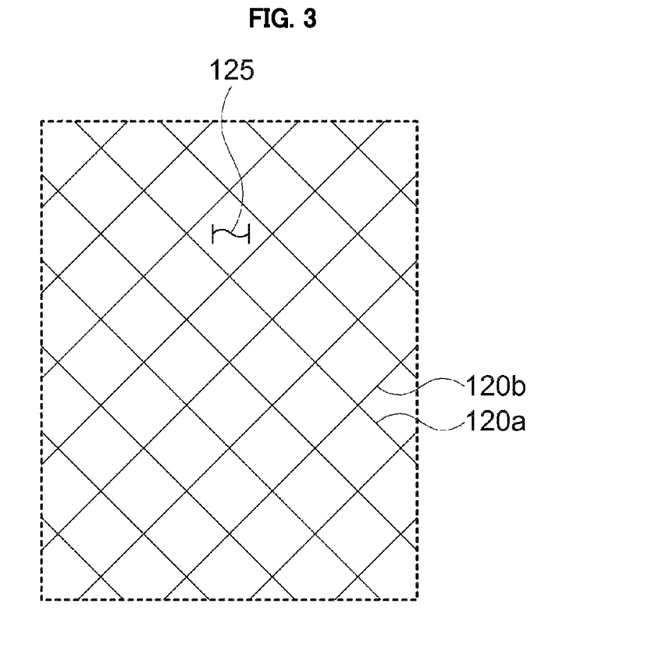
FIGS. 3 and 4 are schematic top planar views illustrating a mesh structure and a unit cell of an antenna device in accordance with exemplary embodiments.
Figure 4:
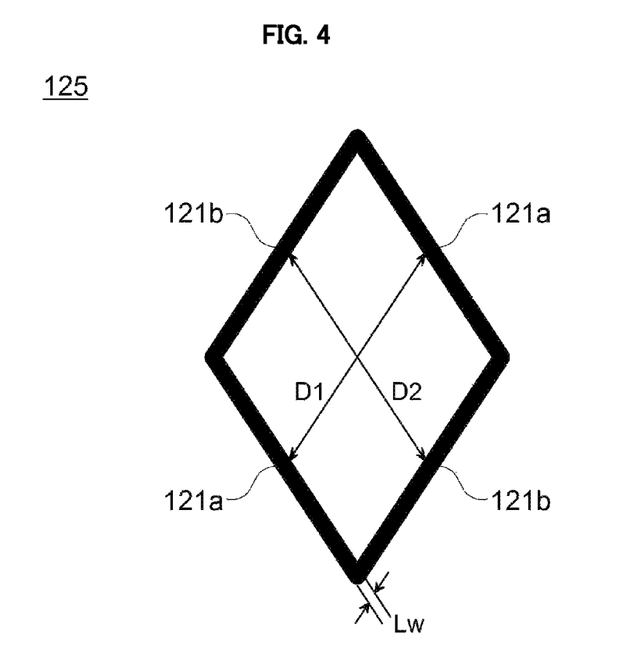

FIGS. 3 and 4 are schematic top planar views illustrating a mesh structure and a unit cell of an antenna device in accordance with exemplary embodiments. For example, FIG. 3 illustrates a mesh structure in the antenna pattern of the antenna device.

For example, the mesh structure included in the antenna pattern may include electrode lines crossing each other.

The mesh structure may include a first electrode line 120a and a second electrode line 120b that may be defined by an extending direction thereof. The first electrode line 120a and the second electrode line 120b may extend in a first direction and a second direction, respectively, to cross each other. A plurality of the first electrode lines 120a and a plurality of the second electrode lines 120b may cross each other to define the mesh structure including unit cells 125 assembled and repeated therein.

The unit cell 125 may be defined by two neighboring first electrode lines 120a and two neighboring second electrode lines 120b which may cross each other. In this case, the unit cell 125 may have a diamond shape or a rhombus shape.

The first electrode lines 120a may face each other and the second electrode lines 120b may face each other in the unit cell 125. Accordingly, contrast and luminance difference may be caused due to a diffraction between the neighboring electrode lines, and shapes or silhouettes of the electrode lines 120a and 120b or the unit cell 125 may be visually observed by a user.

In exemplary embodiments, a visibility index defined by Equation 1 below may be controlled within a predetermined range in consideration of optical properties causing an electrode visibility from the electrode lines 120a and 120b. Thus, the electrode lines 120a and 120b may be prevented from being viewed by the user, and thus degradation of an image quality from a display device may be also prevented.

Visibility Index=Log(contrast×contrast sensitivity function (CSF) value)  [Equation 1]

In exemplary embodiments, the visibility index obtained from the radiation electrode 112 of the antenna device may be in a range from −1.4 to 1.9. Within this range, the radiation electrode 112 may not be viewed by the user while preventing an excessive degradation of a transmittance by the radiation electrode 112.

In the Equation 1 above, the contrast indicates a light and shade difference represented by a brightness ratio of a lightest portion and a darkest portion in a microscope image. For example, as a distance or a pitch between the electrode lines 120a and 120b is increased, the contrast may be increased to easily cause a visibility of the electrode lines 120a and 120b.

In the Equation 1 above, the contrast sensitivity function (CSF) value is a numerical parameter representing a sensitivity with respect to repeated patterns in a human visual system. In an image having a small contrast ratio, a visualizing ability or possibility by a human eye according to a pattern frequency may be numerically provided by the CSF value. As the CSF value increase, a possibility of the electrode lines 120a and 120b being viewed by the human eye may be increased.

Specifically, the CSF value may represent a possibility of being viewed by human using a spatial frequency, a viewing angle and an average luminance as variables. The spatial frequency may be represented by cycles (e.g., cycles per millimeter (CPM)) of light and dark portions in an optical image or a reverse of a pitch of the electrode lines 120a and 120b. The spatial frequency may be converted into cycles per degree (CPD). In exemplary embodiments, the spatial frequency may be measured with a distance between the antenna device and an eye of an observer fixed to 400 mm.

The CSF values may be calculated through functions of Equations 2, 2-1 and 2-2 below.

$$CSF(L, f) = a(L, f)fe^{-b(L)f}(1 + 0.06e^{b(L)f})^{0.5}$$  [Equation 2]

$$a(L, f) = \frac{[540(1 + 0.7/L)^{-0.2}]}{[1 + 12(1 + f/3)^{-2}/w]}$$  [Equation 2-1]

$$b(L) = 0.3(1 + 100/L)^{0.15}$$  [Equation 2-2]

In the Equations 2, 2-1 and 2, L represents an average luminance (unit: nt=cd/m$^2$), ω represents a viewing angle (degree), and f represents a spatial frequency (cycle per degree).

According to exemplary embodiments of the present invention, the visibility index may be used as a parameter representing the contrast that may represent a pattern visible possibility in a microscope image and the CSF value that may represent a sensitivity in a human eye so that the visibility of the electrode lines and the radiation electrode may be suppressed more precisely.

As described above, the visibility index of the radiation electrode 112 may be controlled within a range from about −1.4 to about 1.9. If the visibility index is less than about −1.4, a density of the electrode lines 120a and 120b may be excessively increased to cause a reduction of transmittance (e.g., less than about 85%).

If the visibility exceeds about 1.9, a visible possibility of the electrode lines 120a and 120b may be greater than, e.g., about 70%, and the radiation electrode 112 may be substantially viewed by an eye of a user.

Referring to FIG. 4, the unit cell 125 may have a rhombus shape, and may include a pair of first sides 121a facing each other and a pair of second sides 121b facing each other. The first side 121a may be a portion of the first electrode line 120a and the second side 121b may be a portion of the second electrode line 120b.

A minimum distance between facing sides may be defined as a distance D1 between the first sides 121a or a distance D2 between the second sides 121b. In an embodiment, the distance D1 between the first sides 121a and the distance D2 between the second sides 121b may be the same as each other.

In exemplary embodiments, the minimum distance between the facing sides may be about 225 μm or less. In this case, the contrast or the CSF value in the visibility index may be reduced so that the electrode lines may be prevented from being viewed by the user.

If the minimum distance between the facing sides is excessively decreased, a space in the unit cell 125 may be decreased to degrade a transmittance of the antenna device.

In a consideration of the transmittance and the reduction of an electrode visibility, the minimum distance between the facing sides may be in a range from about 20 μm to about 225 μm, preferably from about 50 μm to about 196 μm.

In exemplary embodiments, a line width Lw of each side of the unit cell 125 or the electrode line may be in a range from about 0.5 μm to about 5 μm. If the line width Lw of the electrode line is less than about 0.5 μm, a signal loss of the antenna device may be excessively increased and effective driving property of the antenna device may not be obtained. If the line width Lw of the electrode line exceeds about 5 μm, the transmittance of the antenna device may be reduced.

The minimum distance between the facing sides of the unit cell 125 and the line width of each electrode line may be adjusted as described above so that the electrode visibility may be suppressed while maintaining the transmittance, and effective signal sensitivity of the antenna device may be achieved. Further, the visibility index within the above range may be easily obtained.

As described above, the unit cell 125 may have, e.g., the rhombus shape, and may have other convex polygonal shape such as a hexagonal shape.

Figure 5:
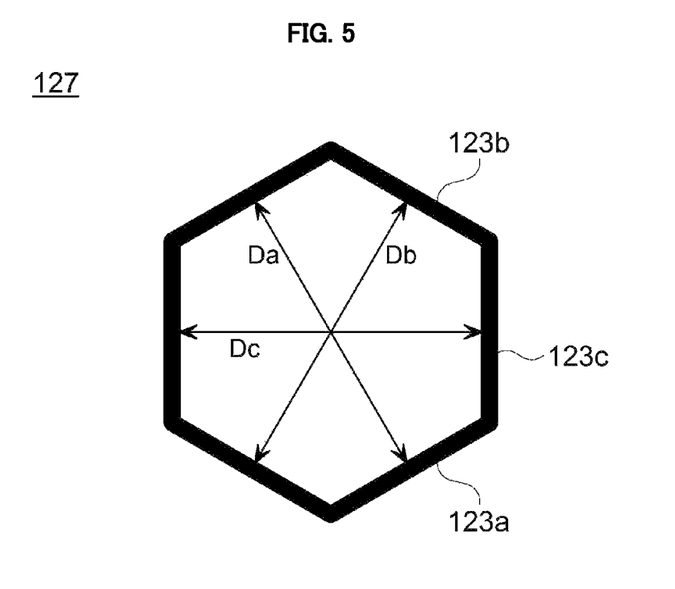
FIG. 5 is a schematic top planar view illustrating a unit cell of an antenna device in accordance with exemplary embodiments.

FIG. 5 is a schematic top planar view illustrating a unit cell of an antenna device in accordance with exemplary embodiments.

Referring to FIG. 5, a unit cell 127 may have a hexagonal shape. In this case, the unit cell 127 may include a first side 123a, a second side 123b and a third side 123c which are portions from electrode lines extending in different three directions. For example, the first side 123a and the second side 123b may extend in two diagonal directions, and the third side 123c may extend in a vertical direction.

A minimum distance between facing sides may include a distance Da between a pair of the first sides 123a facing each other, a distance Db between a pair of the second sides 123b facing each other and a distance Dc between a pair of the third sides 123c facing each other.

In exemplary embodiments, a distance Da between the first sides 123a, the distance Db between the second sides 123b and the distance Dc between the third sides 123c may be the same as or different from each other, and may each be less than about 225 μm or less, preferably from about 20 μm to 225 μm, more preferably from about 50 μm to about 196 μm.

Figure 6:
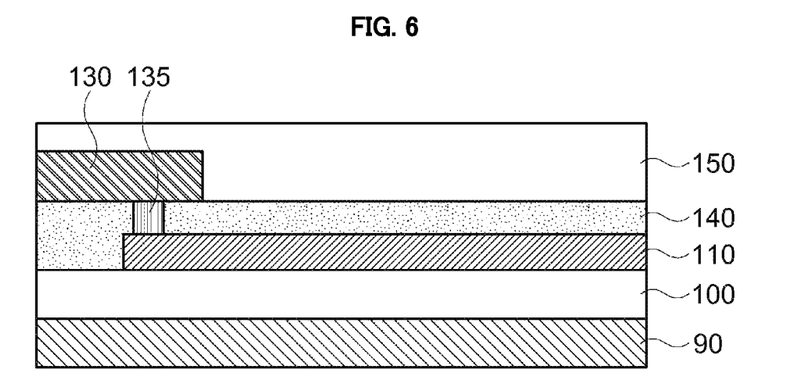
FIGS. 6 and 7 are a cross-sectional view and a top planar view, respectively, schematically illustrating an antenna device in accordance with some exemplary embodiments.
Figure 7:
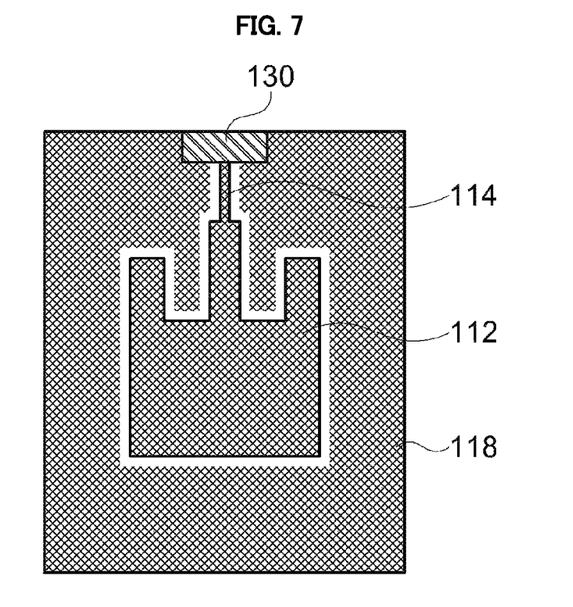

FIGS. 6 and 7 are a cross-sectional view and a top planar view, respectively, schematically illustrating an antenna device in accordance with some exemplary embodiments.

Referring to FIGS. 6 and 7, a pad electrode 130 of the antenna device may have a solid structure (not a mesh structure). Accordingly, a signaling efficiency between the driving IC chip and the radiation electrode 112 may be enhanced and a signal loss may be avoided or reduced.

As illustrated in FIG. 6, in some embodiments, the pad electrode 130 and the antenna pattern (e.g., the first electrode layer 110 including the radiation electrode 112 and the transmission line 114) may be located at different layers or at different levels.

For example, the pad electrode 130 may be located at an upper level of the first electrode layer 110, and may be electrically connected to the first electrode layer 110 via a contact 135.

In an embodiment, an insulating interlayer 140 may be formed on the dielectric layer 100 to cover the first electrode layer 110. The contact 135 may be formed through the insulating interlayer 140 to be electrically connected to the transmission line 114 included in the first electrode layer 110.

The pad electrode 130 may be disposed on the insulating interlayer 140 to be in contact with the contact 135. A protective layer 150 covering the pad electrode 130 may be further formed on the insulating interlayer 140.

For example, a contact hole partially exposing an upper surface of the transmission line 114 may be formed in the insulating interlayer 140. Subsequently, a metal layer or an alloy layer filling the contact hole may be formed and patterned to form the contact 135. In some embodiments, the contact 135 and the pad electrode 130 may be integrally connected to each other as a substantially unitary member. In this case, the contact 135 and the pad electrode 130 may be formed by the same patterning process using the metal layer or the alloy layer.

The insulating interlayer 140 and the protective layer 150 may be formed of an inorganic insulation material such as silicon oxide, silicon nitride, etc., or an organic insulation material such as an acryl-based resin, an epoxy-based resin, a polyimide-based resin, etc.

The pad electrode 130 may be disposed at a peripheral portion of a display device such as a light-shielding portion, a bezel portion, etc. Thus, the pad electrode 130 may not be viewed by the user even when including the solid metal pattern to suppress the signal loss. The radiation electrode 112 that may be disposed at a display region of the display device may include the mesh structure as described above so that the electrode visibility may be reduced while improving the transmittance.

Figure 8:
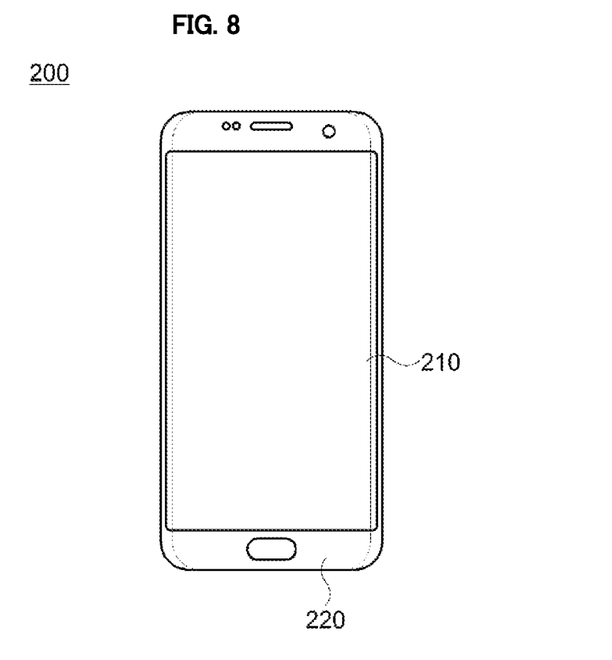
FIG. 8 is a schematic top planar view illustrating a display device in accordance with exemplary embodiments.

FIG. 8 is a schematic top planar view illustrating a display device in accordance with exemplary embodiments. For example, FIG. 8 illustrates an outer shape including a window of a display device.

Referring to FIG. 8, a display device 200 may include a display region 210 and a peripheral region 220. The peripheral region 220 may correspond to both end portions and/or both lateral portions around the display region 210.

In some embodiments, the antenna device as described above may be inserted in the peripheral region 220 of the display device 200 as a patch. In some embodiments, the radiation electrode 112 of the antenna device may be at least partially disposed in the display region 210, and the pad electrodes 116 and 130 may be disposed in the peripheral region 220 of the display device 200.

The peripheral region 220 may correspond to a light-shielding portion or a bezel portion of the display device. A driving circuit such as an IC chip of the antenna device and/or the display device 200 may be also disposed in the peripheral region 220.

The pad electrodes 116 and 130 of the antenna device may be disposed to be adjacent to the driving circuit so that a length of a signal transfer path may be decreased to prevent a signal loss.

In some embodiments, the dummy electrode 118 of the antenna device may be disposed in the display region 210. The radiation electrode 112 and the dummy electrode 118 may be formed to have the same mesh structure including the unit cells as illustrated in FIGS. 3 and 4 so that the transmittance may be increased and the electrode visibility may be effectively prevented.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Experimental Example 1: Evaluation of Electrode Visibility Depending on Visibility Index A mesh structure illustrated in FIG. 3 was formed using an alloy (APC) of silver (Ag), palladium (Pd) and copper (Cu) on a dielectric layer. A line width of an electrode line was 3 μm, and a thickness (or a height) of the electrode line was 2000 Å. A length of a diagonal in an X-direction (designated as X in Table 1) and a length of a diagonal in a Y-direction (designated as Y in Table 1) in a rhombus unit cell were controlled to change a minimum length of facing sides (designated as A in Table 1) so that antenna samples of Examples and Comparative Examples were prepared.

Contrasts of the samples were obtained from images measured using an Olympus microscope SZ61. A distance between the microscope and the sample defined as a vertical distance between an end portion of an objective lens and the electrode was set as 40 cm. The contrast was calculated by Equation below using a brightness distribution of the measured image.

$$\text{Contrast} = (\text{Min} - \text{Max})/(\text{Min} + \text{Max}) * 100 \quad \text{[Equation 3]}$$

(In the Equation 3, Min represents a minimum brightness in the brightness distribution, and Max represents a maximum brightness in the brightness distribution)

CSF values were calculated using the Equations 2, 2-2 and 2-2.

From the obtained values, the visibility index of each sample was calculated using the Equation 1 above. Average luminances (nt), viewing angles (°) and spatial frequencies (CPD: cycles per degree) used in the calculation of the CSF values were also listed in Table 1. The spatial frequencies were measured with a distance between the sample and an eye of an observer fixed to 400 mm.

TABLE 1

| | X (μm) | Y (μm) | A (μm) | Average Luminance (nt) | Viewing Angle (o) | Spatial Frequency | CSF | Contrast | Visibility Index |
|---|---|---|---|---|---|---|---|---|---|
| Example 1-1 | 100 | 200 | 112 | 50 | 7.16 | 69.81 | 0.04 | 1.03 | −1.39 |
| Example 1-2 | 100 | 200 | 112 | 100 | 7.16 | 69.81 | 0.08 | 1.03 | −1.07 |
| Example 1-3 | 100 | 200 | 112 | 500 | 7.16 | 69.81 | 0.19 | 1.03 | −0.70 |
| Example 1-4 | 150 | 300 | 168 | 100 | 7.16 | 46.54 | 2.64 | 2.97 | 0.89 |
| Example 1-5 | 150 | 300 | 168 | 250 | 7.16 | 46.54 | 3.96 | 2.97 | 1.07 |
| Example 1-6 | 175 | 350 | 196 | 50 | 7.16 | 39.89 | 4.50 | 3.72 | 1.22 |
| Example 1-7 | 175 | 350 | 196 | 250 | 7.16 | 39.89 | 9.67 | 3.72 | 1.56 |
| Example 1-8 | 200 | 400 | 224 | 100 | 7.16 | 34.91 | 13.68 | 3.87 | 1.72 |
| Example 1-9 | 200 | 400 | 224 | 250 | 7.16 | 34.91 | 18.53 | 3.87 | 1.86 |
| Comparative Example 1-1 | 225 | 450 | 252 | 50 | 7.16 | 31.03 | 16.71 | 5.16 | 1.94 |
| Comparative Example 1-2 | 225 | 450 | 252 | 500 | 7.16 | 31.03 | 33.92 | 5.16 | 2.24 |
| Comparative Example 1-3 | 400 | 800 | 448 | 50 | 7.16 | 17.45 | 103.16 | 3.50 | 2.56 |
| Comparative Example 1-4 | 400 | 800 | 448 | 100 | 7.16 | 17.45 | 124.85 | 3.5 | 2.64 |

Transmittance and electrode visibility of each sample were evaluated as described below.

(1) Measuring Transmittance

Luminosity factor transmittances (Y_D65) of the samples prepared by Examples and Comparative Examples were measured using a spectrum colorimeter (CM-3600A, Konica Minolta) in 2D observer conditions.

(2) Evaluation of Visibility

The samples prepared by Examples and Comparative Examples were observed by a naked eye to determine whether the electrode line or the mesh structure was viewed. Specifically, 10 panels directly observed the samples and a visible possibility was obtained using the number of panels who determined that electrode patterns were clearly viewed (e.g., the visible possibility was 70% when 7 panels determined that the electrode patterns were viewed).

The results are shown in Table 2 below.

TABLE 2

| 구분 | Transmittance (Y_D65)(%) | Visible Possibility (%) |
|---|---|---|
| Example 1-1 | 85.0 | 0.0 |
| Example 1-2 | 85.0 | 0.0 |
| Example 1-3 | 85.0 | 0.0 |
| Example 1-4 | 87.0 | 20 |
| Example 1-5 | 87.0 | 20 |
| Example 1-6 | 87.6 | 40 |
| Example 1-7 | 87.6 | 40 |
| Example 1-8 | 88.0 | 70 |
| Example 1-9 | 88.0 | 70 |
| Comparative Example 1-1 | 88.4 | 100 |
| Comparative Example 1-2 | 88.4 | 100 |
| Comparative Example 1-3 | 90.6 | 100 |
| Comparative Example 1-4 | 90.6 | 100 |

Referring to Table 2, when the visibility index exceeded 1.9, the visible possibility substantially reached 100%. In Example 1, the transmittance was decreased to 85%, and the transmittance is predicted to be decreased more when the visibility index is less than −1.4.

Experimental Example 2: Evaluation of Resistance and Signal Loss Depending on Line Width of Electrode Line A mesh structure illustrated in FIG. 3 was formed using an APC alloy on a dielectric layer. A minimum distance between facing sides in a rhombus unit cell was fixed to 196 μm as prepared in Example 1-6 of Experimental Example 1, and a line with of the electrode line was changed to prepare samples.

Signal losses (S21,dB), linear resistances and transmittances of the samples were measured.

Specifically, the signal loss was measured from S-parameters obtained by Network analyzer at 28 GHz. The linear resistance was measured by a Resistance simulation (Q3D tool) method. The transmittance was measured by the same method as that in Experimental Example 1. The results are shown in Table 3 below.

TABLE 3

| | Line Width (μm) | Signal Loss (S21, dB) | Linear Resistance (Ω) | Transmittance |
|---|---|---|---|---|
| Sample 1 | 0.5 | −3.0 | 22.5 | 98.9% |
| Sample 2 | 2 | −2.5 | 19.5 | 97.6% |
| Sample 3 | 4 | −2.6 | 17.6 | 93.5% |
| Sample 4 | 5 | −2.3 | 15.8 | 90.5% |
| Sample 5 | 0.4 | −3.3 | 23.6 | 93.4% |
| Sample 6 | 5.5 | −2.1 | 14.7 | 88.6% |
| Sample 7 | 6 | −2.0 | 13.8 | 87.8% |

Figure 9:
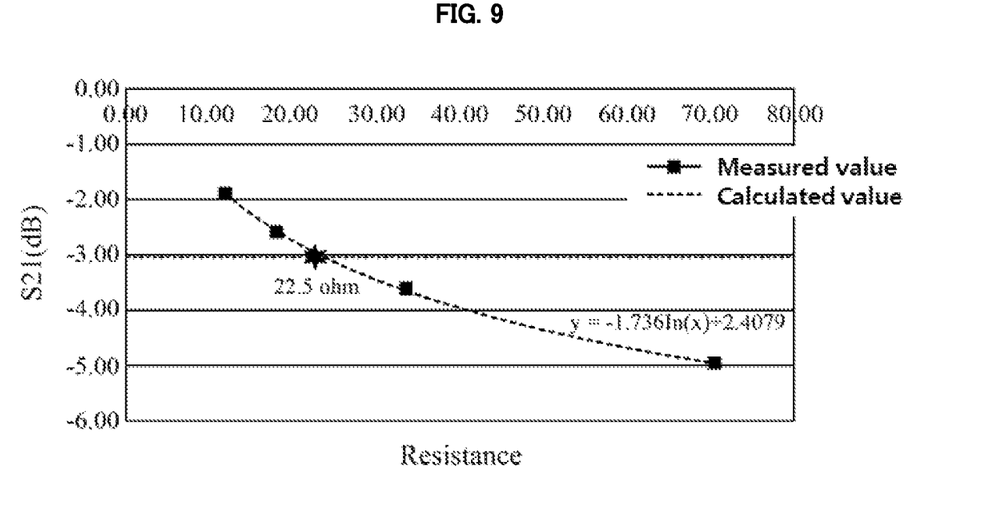
FIG. 9 is a graph showing an exemplary simulation result between a resistance and a signal loss level (S21).

FIG. 9 is a graph showing an exemplary simulation result between a resistance and a signal loss level (S21). Referring to FIG. 9, a target S21 that represents an efficiency (output intensity/input intensity) of 50% or more was set as −3 dB, a resistance of the antenna pattern according to the target S21 was measured as 22.5Ω.

The target S21 was determined by Equation 4 below.

$$S21\ (dB) = 10*Log(output\ intensity/input\ intensity) \quad \text{[Equation 4]}$$

Referring to Table 3 above, the line width having the target signal efficiency was measured as 0.5 μm, and the target signal efficiency was not obtained when the line width of the electrode line was less than 0.5 μm. When the line width of the electrode line exceeded 5 μm, the transmittance of the antenna device was decreased below 90%.

What is claimed is:

1. An antenna device, comprising:
a dielectric layer having a first surface and a second surface opposite to the first surface; and
a radiation electrode on the first surface of the dielectric layer, the radiation electrode comprising a plurality of electrode lines, the radiation electrode having a visibility index in a range from −1.4 to 1.9, the visibility index being defined as Equation 1:

$$\text{Visibility Index} = Log(contrast \times contrast\ sensitivity\ function\ (CSF)\ value). \quad \text{[Equation 1]}$$

2. The antenna device according to claim 1, wherein the CSF value in Equation 1 is calculated from Equations 2, 2-1 and 2-2 below:

$$CSF(L, f) = a(L, f)fe^{-b(L)f}(1 + 0.06e^{b(L)f})^{0.5} \quad \text{[Equation 2]}$$

$$a(L, f) = \frac{[540(1 + 0.7/L)^{-0.2}]}{[1 + 12(1 + f/3)^{-2}/w]} \quad \text{[Equation 2-1]}$$

$$b(L) = 0.3(1 + 100/L)^{0.15} \quad \text{[Equation 2-2]}$$

wherein, in the Equations 2, 2-1 and 2, L represents an average luminance (nt=cd/m2), ω represents a viewing angle (degree), and f represents a spatial frequency (cycle per degree) when a distance between the antenna device and an eye of an observer is 400 mm.

3. The antenna device according to claim 1, wherein the radiation electrode includes a mesh structure in which unit cells defined by the plurality of electrode lines are assembled.

4. The antenna device according to claim 3, wherein a minimum distance between facing sides in each of the unit cells is in a range from 20 μm to 225 μm.

5. The antenna device according to claim 4, wherein the minimum distance between the facing sides in each of the unit cells is in a range from 50 μm to 196 μm.

6. The antenna device according to claim 3, wherein a line width of each of the plurality of electrode lines is in a range from 0.5 μm to 5 μm.

7. The antenna device according to claim 3, wherein the mesh structure comprises first electrode lines and second electrode lines which extend in different directions to cross each other, and each of the unit cells has a rhombus shape.

8. The antenna device according to claim 3, further comprising:
a transmission line connected to the radiation electrode on the dielectric layer; and
a pad electrode connected to one end of the transmission line.

9. The antenna device according to claim 8, wherein the pad electrode has a solid pattern structure.

10. The antenna device according to claim 9, further comprising a contact electrically connecting the pad electrode and the transmission line to each other,
wherein the pad electrode is located at a different level from the radiation electrode and the transmission line.

11. The antenna device of claim 10, further comprising an insulating interlayer formed on the dielectric layer to cover the dielectric layer and the radiation electrode,
wherein the contact is formed through the insulating interlayer.

12. The antenna device according to claim 11, further comprising a protective layer covering the pad electrode and the insulating interlayer.

13. The antenna device according to claim 3, further comprising a dummy electrode arranged around the radiation electrode.

14. The antenna device according to claim 13, wherein the dummy electrode includes a mesh structure the same as that of the radiation electrode.

15. A display device including the antenna device according to claim 1.

* * * * *